US010582351B2

(12) United States Patent
Surnilla et al.

(10) Patent No.: US 10,582,351 B2
(45) Date of Patent: Mar. 3, 2020

(54) METHOD AND APPARATUS FOR VEHICULAR COMMUNICATION

(71) Applicant: Ford Global Technologies, LLC, Dearborn, MI (US)

(72) Inventors: Gopichandra Surnilla, West Bloomfield, MI (US); Karuna Devi Surnilla, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/910,946

(22) Filed: Mar. 2, 2018

(65) Prior Publication Data

US 2019/0274015 A1    Sep. 5, 2019

(51) Int. Cl.
| | |
|---|---|
| *H04W 4/40* | (2018.01) |
| *H04W 76/15* | (2018.01) |
| *H04W 76/30* | (2018.01) |
| *G07C 5/00* | (2006.01) |
| *G07C 5/08* | (2006.01) |
| *H04W 8/18* | (2009.01) |
| H04W 84/04 | (2009.01) |

(52) U.S. Cl.
CPC ............. *H04W 4/40* (2018.02); *G07C 5/008* (2013.01); *G07C 5/0808* (2013.01); *H04W 8/183* (2013.01); *H04W 76/15* (2018.02); *H04W 76/30* (2018.02); *H04W 84/042* (2013.01)

(58) Field of Classification Search
CPC ..... H04W 84/042; H04W 4/40; H04W 8/183; H04W 76/30; H04W 76/15; G07C 5/0808; G07C 5/008
See application file for complete search history.

(56) References Cited

U.S. PATENT DOCUMENTS

| 8,712,474 B2 | 4/2014 | Gehrmann | |
|---|---|---|---|
| 9,408,066 B2 | 8/2016 | Bradley | |
| 9,699,587 B2 | 7/2017 | Cepuran et al. | |
| 2006/0148533 A1* | 7/2006 | Tanneberger | H04W 88/02 455/569.1 |
| 2017/0272935 A1* | 9/2017 | Lei | H04B 1/3816 |
| 2017/0332273 A1* | 11/2017 | Link, II | H04W 76/11 |

* cited by examiner

*Primary Examiner* — Marcos L Torres
(74) *Attorney, Agent, or Firm* — Michael Spenner; Brooks Kushman PC

(57) ABSTRACT

A vehicle includes a controller that is configured to establish a first and second cellular connection, transfer vehicle diagnostic data over the first cellular connection, and transfer entertainment data over the second cellular connection. The first cellular connection may be according to a first cellular standard based on a vehicle Subscriber Identification Module (SIM) profile, and the second cellular connection may be according to a second cellular standard, different than the first, based on a personal SIM profile received from a cellular device.

19 Claims, 4 Drawing Sheets

METHOD AND APPARATUS FOR VEHICULAR COMMUNICATION

TECHNICAL FIELD

This application is generally related to systems and methods to parse vehicle data between a fixed Subscriber Identity Module (SIM) channel and a soft SIM received from a personal cellular phone.

BACKGROUND

Cellular modems are being integrated into many consumer items expanding the Internet of things. One of the additions is the integration of a cellular modem in an automobile.

SUMMARY

A vehicle includes a controller that is configured to establish a first and second cellular connection, transfer vehicle diagnostic data over the first cellular connection, and transfer entertainment data over the second cellular connection. The first cellular connection may be according to a first cellular standard based on a vehicle Subscriber Identification Module (SIM) profile, and the second cellular connection may be according to a second cellular standard, different than the first, based on a personal SIM profile received from a cellular device.

A controller-implemented method for a vehicle includes establishing a first and second cellular connection and transferring vehicle diagnostic data over the first cellular connection, and transferring entertainment data over the second cellular connection. The first cellular connection may be according to a first standard based on a vehicle Subscriber identification Module (SIM) profile, and the second cellular connection may be according to a second cellular standard, different than the first, based on a personal SIM profile received from a cellular device.

A vehicle includes a transceiver and a controller. The controller may be configured to, via the transceiver, establish a first and second cellular connection, transfer vehicle diagnostic data over the first cellular connection, and transfer entertainment data over the second cellular connection. The first cellular connection may be according to a first standard based on a vehicle Subscriber Identification Module (SIM) profile, and the second cellular connection may be according to a second standard, different than the first, based on a personal SIM profile received from a cellular device,

DETAILED DESCRIPTION

Figure 1:
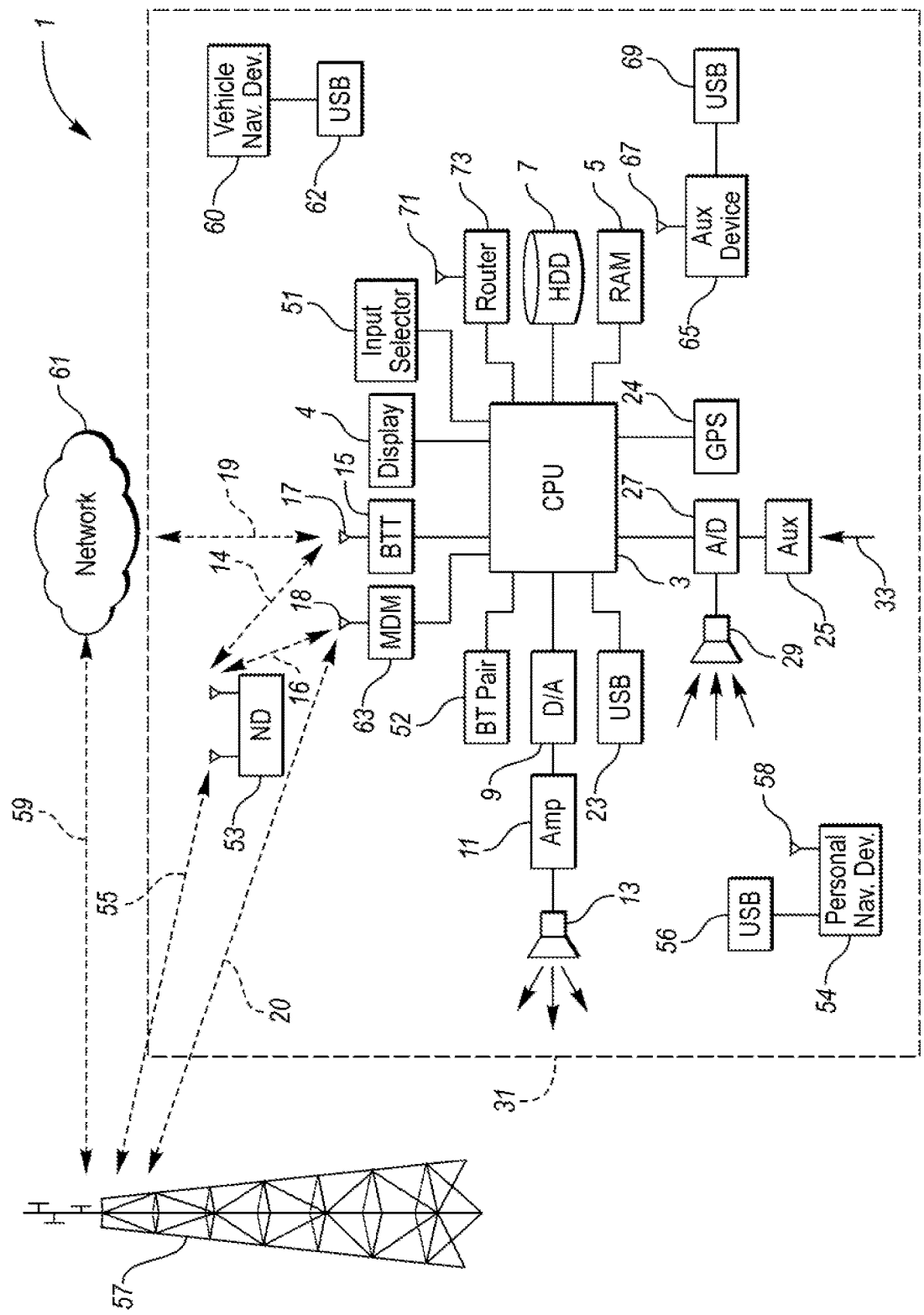
FIG. 1 is schematic diagram of a vehicle computing system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Cellular modems are being integrated into many consumer items including automobiles. To balance the increase in adoption, the cellular service providers are employing a variety of cellular subscription plans such that the consumers can select a plan that balances the costs and benefits that they desire. For example, one plan may limit data usage or data transfer rates during peak times while allowing, for higher data usage or data transfer rates/bandwidth during off-peak times. Also, to draw in customers, cellular service providers are offering benefits to subscribers, in which the benefits may include bundled streaming services such as sporting events streamed National Football League games), entertainment/shows (e.g., streaming Home Box Office (HBO), NetFlix, YouTube, etc.), or music (e.g., Apple Music, iHeartRadio, Milk Music, Pandora, Rhapsody, Slacker, or Spotify), and with some carriers the plans are structured such that the streaming of data for the listed services does not count against your plans data. Here, entertainment data is non-vehicle data including music, movies, videos, personal phone calls, personal text messages, and personal notifications. The entertainment data is information regarding personal events, whereas vehicle data is information concerning functionality of the vehicle.

However, when traveling in a vehicle, the cellular connection may be compromised by the metal of the vehicle's structure (e.g., roof, doors, etc.), resulting in dropped calls or a reduced transmission rate/bandwidth. Conversely, a cellular modem of a vehicle may include an external antenna that has a higher gain than that of a portable cellular phone. Along with the increase gain of the antenna itself, the antenna of a vehicle has a built-in ground plane that may include a roof, trunk, or hood.

Along with a SIM, a cellular phone may contain an International Mobile Equipment Identity (IMEI) number that is usually unique to a cellular/satellite radio (e.g., mobile phone or satellite phone). The IMEI is stored in non-volatile memory within the radio and may be displayed on a screen of the phones via accessing a settings menu. Generally, the IMEI number is used by a cellular (e.g., GSM) network to identify valid devices and therefore a phone can be excluded from accessing the network if the phone's IMEI number is entered on a carrier's blacklist regardless of the status of the phone's subscriber identity module (SIM). The IMEI is only used for identifying the radio/device and typically is not permanently or semi-permanently related to a subscriber. Generally, a subscriber is identified by an International Mobile Subscriber Identity (IMSI) number, that may be stored on the SIM card and therefore may be transferred to any cellular radio.

Further, a SIM module includes a SIM serial number (SSN), also referred to as an ICC-ID (Integrated Circuit Card ID). The ICC-ID is mainly for international identification and typically includes 19 digits and specific information regarding the service provider, location, and date of manufacture. The first two digits are a telecom ID, the second two digit refer to the country code, the third two digits are a network code, the next four digits is the date of manufacture (month and year), the next two digits are a switch configuration code, the next six digits are the SIM number, and the last digit is the checksum.

Currently, a vehicle that is equipped with a cellular module (e.g., a telecommunication unit (TCU)) requires a dedicated cellular service plan with a cellular subscriber for all connected services used by the TCU. Therefore, a customer may have to pay for his vehicle's cellular plan and again for a personal cellular service plan for a personal cellular phone. Further, many vehicles are configured such that a smartphone may be connected to the vehicle via Bluetooth or other short-range wireless connection and then can access the phone functions such as music, phone, texting, etc. through the vehicle's infotainment system. However, there are certain disadvantages with this current structure. First, many functions that can be accessed through the vehicle are limited by the data transfer rate of Bluetooth (e.g., streaming video). Second, the cellular service is accessed through the phone leading to a large battery drain. Third, the antenna of the phone may not be robust to access the data from cellular line while the vehicle in moving compared to a cellular antenna of the vehicle. This may result in a break of service e.g., dropped call, or steaming) especially when using applications or functions that require large data rate such as videos, downloading data, etc.

Here a vehicle controller such as a telematic unit, infotainment system, a vehicle computing system, or a gateway module is equipped with a mechanism to accept a soft transfer of information from a Subscriber identity Module (SIM) card a personal cellular device to the vehicle. Thus, the cellular line of the personal cellular device (e.g., a nomadic device) is thus transferred from the device to the vehicle. The controller may output a signal or message to disable the cellular device such that all cellular based functions (e.g., incoming or outgoing calls, text messages, application notifications) be performed by the vehicle. Likewise, the controller may include a dedicated SIM such that all vehicle based cellular information be transferred based on a connection using the vehicle SIM profile. For example, vehicle based cellular information may include a vehicle module firmware upgrade, activation of vehicle systems, such as valet mode, remote start, remote door lock/unlock, or provide vehicle diagnostic function including charging status, vehicle status, vehicle location, or execution of a vehicle diagnostic scan and transmission of the results of the vehicle diagnostic scan.

The standards for cellular technology include 2G/2.5G standards designated Global System for Mobile Communications (GSM) and related, (e.g., General Packet Radio Services (GPRS) and Enhanced Data rates for GSM Evolution (EDGE)), 3G standards designated Universal Mobile Telecommunications System (UMTS) and related (e.g., HSPA), 4G standards designated Long Term Evolution (LTE) and related (e.g., LTE Advanced and LTE Advanced Pro), 5G standards designated Next Generation and related standards, and other future cellular standards (e,g., IP Multimedia Subsystem (IMS), etc.). The standards for cellular technology may he locally regulated by organizations such as the Association of Radio Industries and Businesses (ARIB) in Japan, the Alliance for Telecommunications Industry Solutions (ATIS) in the USA, the China Communications Standards Association (CCSA) in China, the European Telecommunications Standards Institute (ETSI) in Europe, the Telecommunications Standards Development Society (TSDSI) in India, the Telecommunications Technology Association (TTA) in Korea, the Telecommunication Technology Committee (TTC) in Japan, or other country regulating authority. This document is based on the ETSI standards as adopted by ATIS and other governing bodies. Different types of cellular standards include Global System for Mobile Communications (GSM), time-division multiple access (TDMA), frequency-division multiple access (FDMA), code-division multiple access (CDM A), or orthogonal frequency-division multiple access (OFDMA).

Typically, a cellular device operates with a SIM, IMEI, and IMSI associated with it. Here a controller controls data flow and manages cellular connections based on an internal SIM and an external SIM profile that received from an in-vehicle nomadic device thus allowing for service plans to reflect intended usage. For example, a single data plan from the phone may be used for personal/entertainment/business cellular functions while the vehicle SIM is used for vehicle functions. Also, in ride sharing vehicles, each passenger may have their own entertainment center that uses their wireless data service by enabling the transfer of their phone SIM to the car via soft SIM transfer. The vehicle radio/antenna may provide greater reception, while the personal cellular service plan may provide receiving of content (e.g., streaming of multimedia such as Netflix, HBO, NFL, etc.). Also, an in-car sharing service can he enabled in which a passenger (e.g., a rear seat passenger) can share their data plan and services to be used (displayed/streamed in the vehicle).

When using the vehicle's telematics system to connect to the cellular network, the connected may be significantly stronger as a car's mounted antenna may have higher gain. As the vehicle is equipped with two SIMs, a hard SIM/dedicated vehicle SIM for performing remote link functions such as starting the car, locating the vehicle, diagnostics, etc. and a soft SIM or re-programmable SIM for temporally holding and operating with SIM information that was transferred from a cellular device to the car temporarily to use the data services for personal/entertainment functions such as receiving text messages, notifications, watching videos, or connected services such as web surfing, payment services such as parking/toll payments, navigation, etc. When the cellular device transfers its SIM to the Soft SIM, the vehicle controller may transmit a disable command to disable the cellular radio of the cellular device such that only a single system is active on the cellular network using the cellular device's SIM profile. Along with the cellular device's SIM information, it may be necessary to transfer other account information including an IMEI, IMSI, phone number, account holder's name, etc. After that information is shared, the cellular connectivity is transferred from the phone to the CAR with an acceptance of the customer on the connected phone. The Soft SIM information may be transferred from the phone to the car via Bluetooth, NFC, inductive coupling, Fi or other communication protocol. The vehicle's telematics system may include a single radio capable of making a single connection, or a radio that is capable of making multiple connections. Often a radio with a single tuner is capable of forming a single connection, and a dual tuner radio is capable of making two connections, however, a single tuner radio may also make multiple connections if the connections are time sliced.

FIG. 1 illustrates an example block topology for a vehicle based computing system 1 (VCS) for a vehicle 31. An example of such a vehicle-based computing system 1 (e.g., an infotainment system) is the SYNC system manufactured by THE FORD MOTOR COMPANY. A vehicle enabled with a vehicle-based computing system may contain a visual front-end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor, in this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a Controller Area Network "CAN bus", and Ethernet bus, FlexRay bus, Local Interconnect Network "LIN bus" or other vehicle communication bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between. CPU 3 and network 61 utilizing, for example, a data-plan, data over voice, or DTMF tones associated with ND 53. Alternatively, it may be desirable to include an onboard modem 63 having antenna I 8 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Division Multiple Access (CDM), Time Division Multiple Access (TDMA), Space-Division Multiple Access (SDMA) for digital cellular communication. If the user has a data-plan associated with the nomadic device, it is possible that the data-plan allows for broadband transmission and the system could use a much wider bandwidth (speeding up data transfer), in yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USE connection 56 and/or an antenna 58, a vehicle navigation device 60 having a USE 62 or other connection, an onboard OPS device 24, or remote navigation system (not shown) having connectivity to network 61. USE is one of a class of serial networking protocols. IEEE 1394

(FireWire™ (Apple), i.LINK™ (Sony), and Lynx™ (Texas instruments)), EIA (Electronics Industry Association) serial protocols, IEEE 1284 (Centronics Port), S/PDIF (Sony/Philips Digital Interconnect Format) and USE-IF (USE Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative embodiments, whenever a user wants to travel a route or use a transportation service, the process can use the illustrative embodiments and the like, to determine if parental approval is required before transportation can proceed. So, in the case of a personal vehicle, inputting an impermissible route may require approval before the route guidance will begin. In the case of an on-demand service, the type of service, a planned route or a destination may require approval before the user can actually access a service to hire the vehicle. This can allow guardians to provide their charges with on-demand transportation services, without fear of unapproved rides or destinations. This feature could be integrated into a parental watchdog application or into various on-demand applications directly, among other possible implementations.

Figure 2:
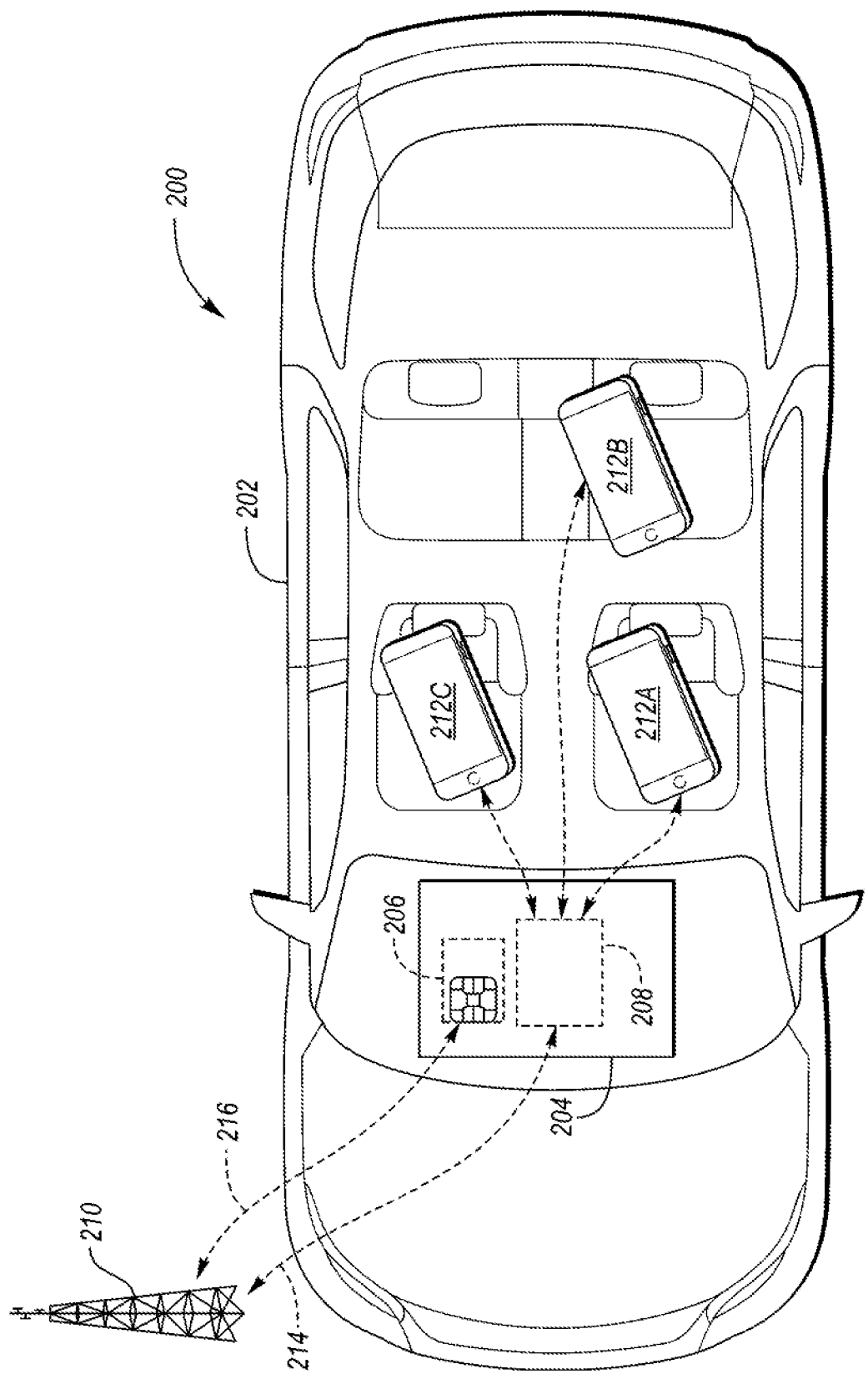
FIG. 2 is a top view of a block diagram of a cellular system for a vehicle.

FIG. 2 is a top view of a block diagram of a cellular system 200 for a vehicle 202. The vehicle 202 includes a cellular controller 204 that may be referred to as a telematics unit, gateway module, or infotainment system. The controller 204 includes a vehicle SIM 206 and a memory 208. The controller 204 includes the hardware and software required to communicate with a cellular tower 21. The controller may connect with cellular devices 212 such as a driver's cellular phone 212A, a passenger's cellular tablet 212B, and a rear seat passenger's cellular device 212C. The connection may be wireless, such as Bluetooth, Wi-Fi, inductive coupling, IrDA, or other wireless connection method, or it may be a wired connection such as via a USE port, an HDMI port, or other wired connection. Upon connection, the controller 204 sends to the cellular devices 212 a request to share cellular account information and data. The cellular device 212 may then display the request expecting a confirmation of sharing, a decline of sharing or no response. A location of the cellular device may be obtained by either triangulation of connection, or a question presented on the screen of the device. If the request is acknowledged by the cellular device user, (possibly requiring entering an account personal identification number (PIN)), the controller may then request account information such as SIM data, an IMEI, an IMSI, an account name, a carrier account number, or other related information. For example, if the SUM is with a carrier (e.g., AT&T) to form a first connection 216 and the phone 212A also uses the carrier (e.g., AT&T) to form the second connection 214, it is possible that only SIM data is required, however, if the tablet 212B uses a different carrier (e.g., Verizon or T-mobile) to form the second connection 214, then the controller may require more information such as an IMEI, IMSI, account number, name and PIN.

Figure 3:
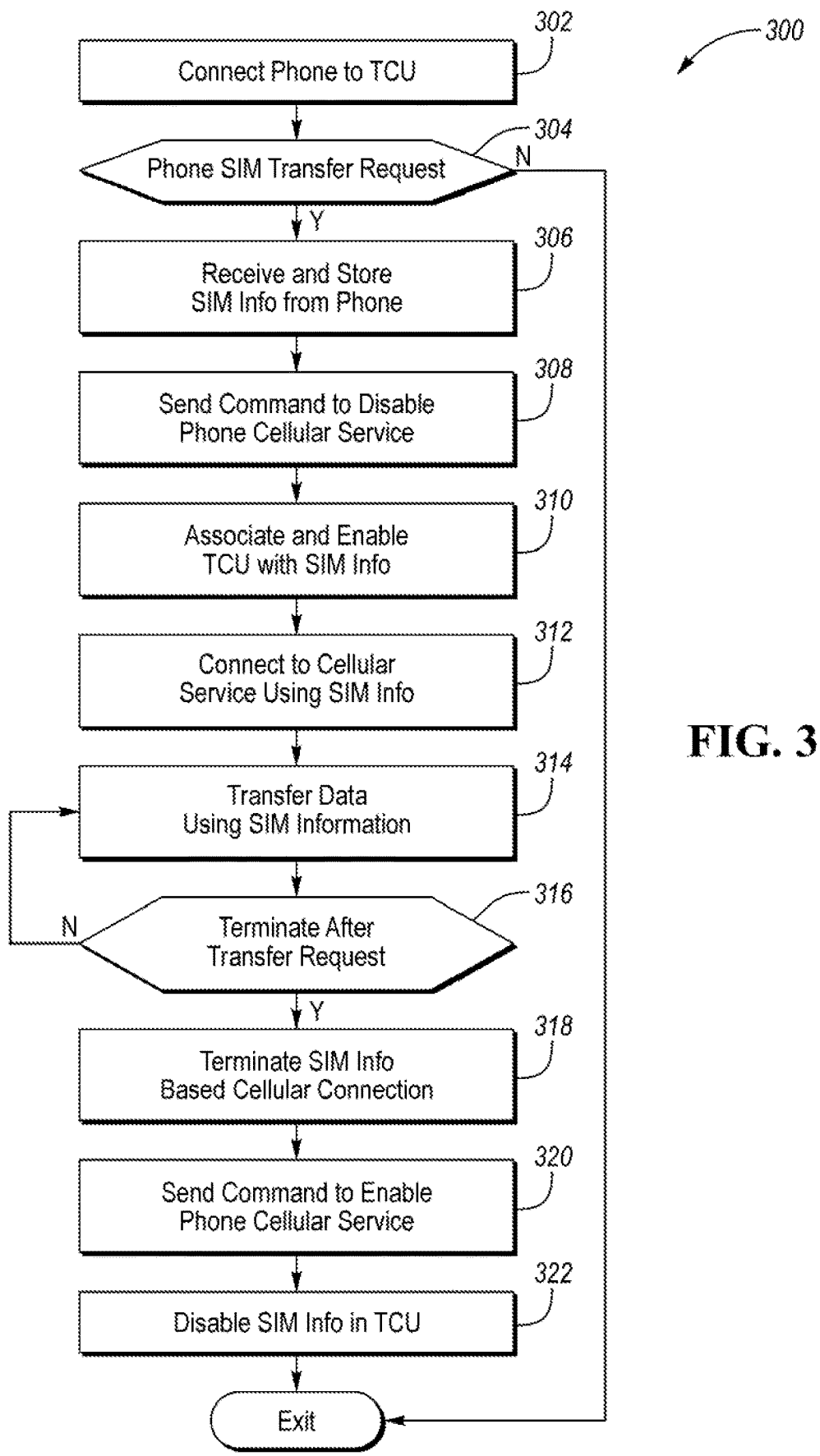
FIG. 3 is flow diagram of SIM sharing for a vehicular system.

FIG. 3 is flow diagram of SIM sharing 300 for a vehicular system. In step 302, a controller connects with a cellular device (e.g., a phone, tablet, watch, or other connected device) and proceeds to step 304 in which the controller branches based on a status of a SIM transfer request. If the SIM transfer request is not authorized the controller will exit, if the SIM transfer request is authorized the controller will branch to step 306 in which the controller will receive and store account information (e.g., SIM profile, IMEI, IMSI, etc.) from the cellular device. Then in step 308, the controller will send a command to the cellular device acknowledging reception of the account information and commanding the cellular device to disable the cellular radio. The controller in step 310 will then associate the account information with the vehicle and in step 312 the controller will connect with a cellular network based on the account information. Ater the connection is made, data may be transferred in step 314 until a termination request is received in step 316 and the controller branches to terminate cellular connection that is based on the cellular device's SIM information in step 318. Upon termination of the cellular connection, the controller in step 320 transmits a command to enable the cellular radio of the cellular device and disables, in step 322, the SIM information in the vehicle system 204.

Figure 4:
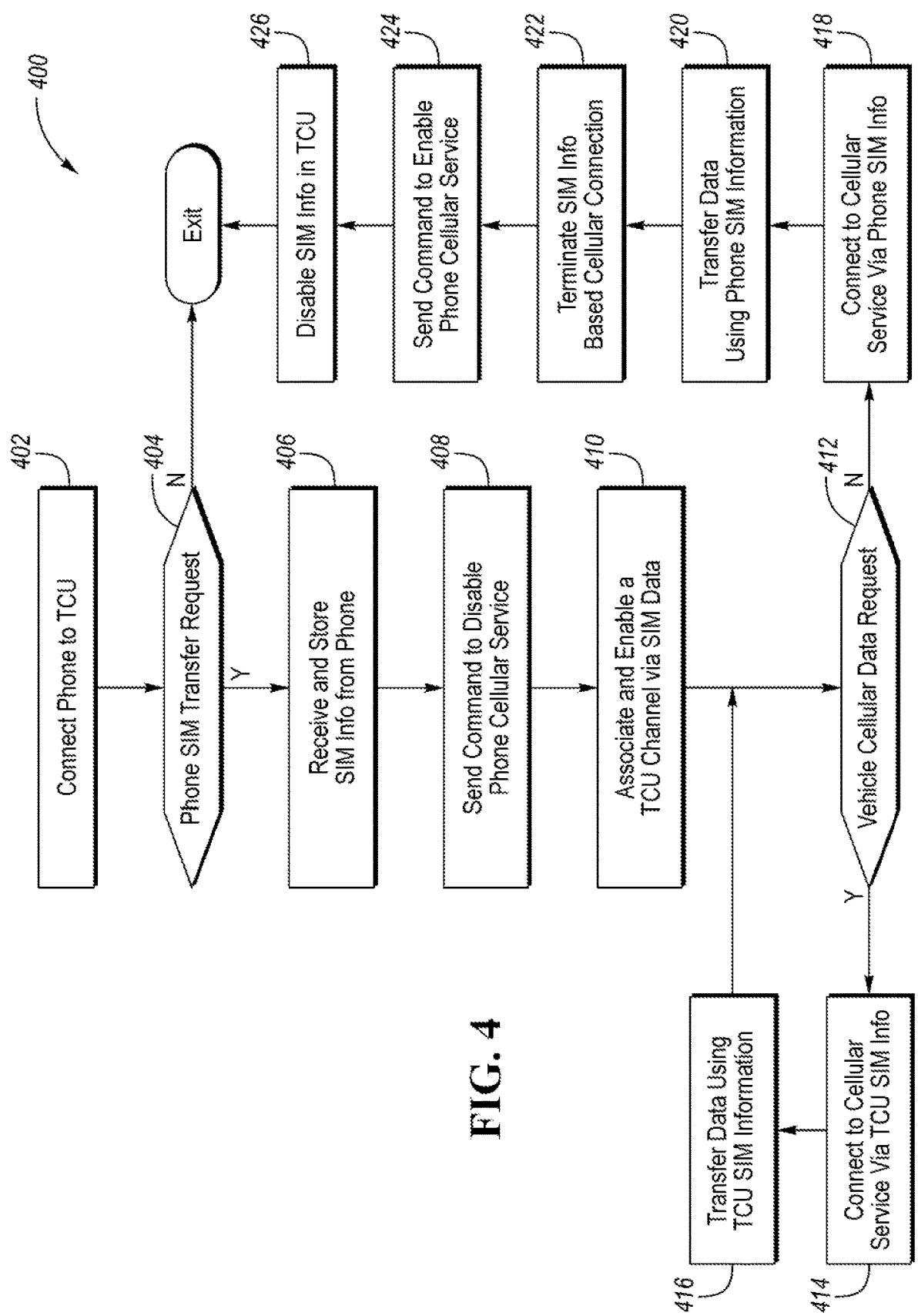
FIG. 4 is flow diagram of a dual SIM system with data parsed and routed to a cellular channel based on a characteristic of the data.

FIG. 4 is flow diagram of a dual SIM system with data parsed and routed to a cellular channel based on a characteristic of the data.

In step 402, a controller connects with a cellular device (e.g., a phone, tablet, watch, or other connected device) and proceeds to step 404 in which the controller branches based on a status of a SIM transfer request. If the SIM transfer request is not authorized the controller will exit, if the SIM transfer request is authorized the controller will branch to step 406 in which the controller will receive and store account information (e.g., SIM profile, IMEI, IMSI, etc.) from the cellular device. Then in step 408, the controller will send a command to the cellular device acknowledging reception of the account information and commanding the cellular device to disable the cellular radio. The controller in step 410 will then associate the account information with the vehicle and in step 412 the controller will branch based on a characterization of the data, if the data is vehicle data (e.g., vehicle diagnostic data, remote start/stop, vehicle module firmware update/re-flash, or a vehicle location) the controller will branch to step 414 in which the controller establishes a connection with a cellular network based on the vehicle SIM (e.g., hard SIM). The controller will then proceed to step 416 and transfer the data based on the protocol and standard of the connection via the vehicle SIM.

If the data is non-vehicle data (e.g., phone calls, text messages, entertainment, email, notifications, etc.) the controller will branch to step 418 in which the controller establishes a connection with a cellular network based on the cellular device's SIM (e.g., soft SIM). The controller will then proceed to step 420 and transfer the data based on the protocol and standard of the connection via the soft SIM. After the data transfer/cellular connection session is complete, the controller may then terminate the call in step 422. The controller, in step 424, will then transmit a command to enable cellular services in the cellular device 212. And in step 426, the controller will disable the SIM in the vehicle system 204.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated maybe performed in the sequence illustrated, in parallel, or in sonic cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or Characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a cellular modem;
a transceiver; and
a controller configured to access a cellular network, programmed to:
responsive to identifying a plurality of cellular devices within the vehicle, identify a cellular device of the plurality of cellular devices to connect to by a seat location via triangulation using the transceiver,
establish, via the transceiver, a wireless link to the cellular device, the cellular device being configured to access the cellular network using a personal Subscriber Identification Module (SIM) profile stored to the cellular device,
obtain the personal SIM profile from the cellular device via the wireless link, establish, via the cellular modem, a first cellular connection over the cellular network using a vehicle SIM profile using a first cellular standard,
establish, via the cellular modem, a second cellular connection over the cellular network using the personal SIM profile using a second cellular standard, the second cellular standard being different than the first standard,
instruct the cellular device via the wireless link to disable access of the cellular device to the cellular network using the personal SIM profile,
transfer vehicle diagnostic data over the first cellular connection,
transfer entertainment data over the second cellular connection,
responsive to disconnection of the cellular device from the vehicle via the wireless link, terminate the second cellular connection, and
delete memory of the controller that stores the personal SIM profile upon termination of the second cellular connection.

2. The vehicle of claim 1, wherein the first cellular standard is a Global System for Mobile Communications (GSM), a time-division multiple access (TDMA), a frequency-division multiple access (FDMA), a code-division multiple access (CDMA), or an orthogonal frequency-division multiple access (OFDMA) standard.

3. The vehicle of claim 1, wherein the controller is further configured to trigger execution of a diagnostic scan of the vehicle and transfer an output of the scan over the first cellular connection.

4. The vehicle of claim 1, wherein the second cellular connection further uses an IMEI number and an IMSI number of the cellular device.

5. The vehicle of claim 1, wherein the cellular device is a cellular phone, cellular tablet, cellular watch, cellular ring, cellular eyeglasses, or cellular earphones.

6. The vehicle of claim 1, wherein the personal SIM profile includes: SIM data, IMEI number, and IMSI number, and
the controller is further programmed to:
identify if the personal SIM profile and the vehicle SIM profile are subscribed to a same carrier;
responsive to identifying the personal SIM profile and the vehicle SIM profile are subscribed to the same carrier, use only the SIM data to establish the second cellular connection; and
responsive to identifying the personal SIM profile and the vehicle SIM profile are subscribed to different carriers, use SIM data, IMEI number, and IMSI number to establish the second cellular connection.

7. The vehicle of claim 1, wherein the controller is further configured to, responsive to a key-off request, terminate the second cellular connection.

8. The vehicle of claim 1, wherein the controller is configured to store the personal SIM profile such that the SIM profile persists through multiple vehicle drive cycles.

9. A controller-implemented method for a vehicle, comprising:
responsive to detecting a plurality of cellular devices within the vehicle identifying a cellular device of the plurality of cellular devices to connect to by a seat location via triangulation using a transceiver;
establishing, via the transceiver, a wireless link to the cellular device configured to access a cellular network using a personal Subscriber Identification Module (SIM) profile stored to the cellular device;
obtaining the personal SIM profile from the cellular device via the wireless link;
establishing, via a modem, a first cellular connection using a vehicle SIM profile,
establishing, via the modem, a second cellular connection using the personal SIM profile received from the cellular device;
sending a command to the cellular device, via the wireless link, instructing the cellular device to disable cellular service on the cellular device using the personal SIM profile;
transferring vehicle diagnostic data over the first cellular connection;
transferring entertainment data over the second cellular connection;
responsive to disconnection of the cellular device from the vehicle via the wireless ink, terminating the second cellular connection; and
deleting memory of the controller that stores to personal SIM profile upon termination of the second cellular connection.

10. The method of claim 9, further comprising:
providing a user with a choice between SIM profiles of cellular devices within the vehicle for use in establishing the second cellular connection.

11. The method of claim 9, further comprising triggering execution of a diagnostic scan of the vehicle and transferring an output of the scan over the first cellular connection.

12. The method of claim 9, further comprising terminating the second cellular connection when the cellular device becomes disconnected from the controller.

13. The method of claim 9, further comprising deleting user account information from the controller when the cellular device becomes disconnected from the controller.

14. The method of claim 9, further comprising terminating second cellular connection in response to power down of the vehicle.

15. The method of claim 9, wherein the personal SIM profile includes: SIM data, IMEI number, and IMSI number, and
the method further comprising:
identifying if the personal SIM profile and the vehicle SIM profile are subscribed to a same carrier;
responsive to identifying the personal SIM profile and the vehicle SIM profile are subscribed to the same carrier, establishing the second cellular connection using only the SIM data; and
responsive to identifying the personal SIM profile and the vehicle SIM profile are subscribed to different carriers, establishing the second cellular connection using SIM data, IMEI number, and IMSI number.

16. A vehicle comprising:
a modem;
a transceiver; and
a controller configured to,
responsive to identifying a plurality of cellular devices within the vehicle, identify a cellular device of the plurality of cellular devices to connect to by a seat location via triangulation using the transceiver,
establish, via the transceiver, a wireless link to the cellular device configured to access a cellular network using a personal Subscriber Identification Module (SIM) profile stored to the cellular device,
obtain the personal SIM profile from the cellular device via the wireless link,
obtain a seat location of the cellular device within the vehicle via a user input to the cellular device, establish, via the modem, a first cellular connection using a vehicle SIM profile with a first standard, establish, via the modem, a second cellular connection using the personal SIM profile received from the cellular device with a second standard, different than the first standard, send a command to the cellular device via the wireless link, instructing to disable cellular service on the cellular device based on the personal SIM profile, transfer vehicle diagnostic data over the first cellular connection, transfer entertainment data over the second cellular connection, responsive to disconnection of the cellular device from the vehicle via the wireless link, terminate the second cellular connection, and delete memory of the controller that stores the personal SIM profile upon termination of the second cellular connection.

17. The vehicle of claim 16, wherein the controller is further configured to receive, over the first cellular connection, updated firmware for a vehicle module, and trigger re-programming of the vehicle module with the updated firmware.

18. The vehicle of claim 16, wherein the transceiver is a single channel transceiver and the first and second cellular connection are time sliced.

19. The vehicle of claim 16, wherein the personal SIM profile includes: SIM data, IMEI number, and IMSI number, and the controller is further programmed to:
    identify if the personal SIM profile and the vehicle SIM profile are subscribed to a same carrier;
    responsive to identifying the personal SIM profile and the vehicle SIM profile are subscribed to the same carrier, use only the SIM data to establish the second cellular connection; and
    responsive to identifying the personal SIM profile and the vehicle SIM profile are subscribed to different carriers, use SIM data, IMEI number, and IMSI number to establish the second cellular connection.

* * * * *